United States Patent
Liu et al.

(10) Patent No.: US 7,496,386 B2
(45) Date of Patent: Feb. 24, 2009

(54) RECHARGEABLE BATTERY FACILITATED CUSTOMER-PREMISES EQUIPMENT

(75) Inventors: Qingwen Liu, Richardson, TX (US); John Grabner, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 50 days.

(21) Appl. No.: 11/703,371

(22) Filed: Feb. 7, 2007

(65) Prior Publication Data

US 2008/0096601 A1    Apr. 24, 2008

Related U.S. Application Data

(60) Provisional application No. 60/853,956, filed on Oct. 24, 2006.

(51) Int. Cl.
*H04B 1/38* (2006.01)
(52) U.S. Cl. .............. 455/573; 455/572; 455/127.1; 455/343.1
(58) Field of Classification Search .......... 455/522, 455/343.1–2, 573, 572, 126, 127.1–3, 574, 455/571, 127.5, 69, 343.1, 343.2, 343.5, 455/343.6, 127.1, 127.3, 343.5–6, 343.1–6; 320/132, 136
See application file for complete search history.

(56) References Cited

U.S. PATENT DOCUMENTS

| | | | | | |
|---|---|---|---|---|---|
| 5,278,541 | A | * | 1/1994 | Wicht et al. | 340/636.15 |
| 5,994,875 | A | * | 11/1999 | Lee | 320/132 |
| 7,174,176 | B1 | * | 2/2007 | Liu | 455/462 |
| 2004/0130352 | A1 | * | 7/2004 | Ekkart et al. | 327/51 |
| 2006/0194624 | A1 | * | 8/2006 | Hsieh et al. | 455/574 |
| 2007/0090804 | A1 | * | 4/2007 | Kim et al. | 320/132 |

* cited by examiner

*Primary Examiner*—John J Lee
(74) *Attorney, Agent, or Firm*—Edell, Shapiro & Finnan, LLC

(57) ABSTRACT

A Customer-Premises Equipment (CPE) device includes a power supply for generating a first power at a first voltage level; a rechargeable battery for generating a second power at a second voltage level; and a power amplifier coupled to the power supply and the rechargeable battery for receiving the first power and the second power to output a third power at a third voltage level higher than either the first voltage level or the second voltage level, wherein the third power is utilized to transmit signals from the CPE device to a BTS.

18 Claims, 2 Drawing Sheets

RECHARGEABLE BATTERY FACILITATED CUSTOMER-PREMISES EQUIPMENT

CROSS REFERENCE

The present application claims the benefits of U.S. Provisional Patent Application Ser. No. 60/853,956, which was filed on Oct. 24, 2006 and entitled "Uplink Transmit Power Management for Rechargeable Battery Facilitated Mobile Station."

BACKGROUND

The present invention relates generally to wireless communication networks, and more particularly to rechargeable battery facilitated customer-premises equipment (CPE) for improving uplink transmission power management.

A typical wireless communication network is comprised of at least one base transceiver station (BTS) that transmits and receives signals to and from one or more CPE devices via wireless links. The BTS is designed to carry out functions, such as signal transmission/reception and channel resource allocation. The CPE device generally refers to any electronic apparatus located in a user's premise for connecting to the BTS via wireless channels within a wireless communication network. Examples of CPE include telephones, DSL (Digital Subscriber Line) modems, cable modems, cellular phones, set-top boxes and routers.

FIG. 1 illustrates a conventional CPE device 100 that is connected to a BTS 150 via uplink channels. The CPE device 100 is connected to a power supply 102 for receiving power at a voltage level Pin. The power supply 102 can be, for example, a regular DC power line of an AC adaptor, a universal serial bus (USB) cable, and a battery that outputs relatively constant voltage. The power supply 102 provides the CPE device 100 with power Pin, such that a transmitter 104 implemented within the CPE device 100 can transmit signals to the BTS 150 at power level Pul via uplink channels. In some cases, the power level Pul required for the transmitter 104 to transmit uplink signals to the BST exceeds the power level Pin from the power supply 102, thereby resulting in low quality or failure of communications.

As such, what is needed is a CPE device that is able to transmit uplink signals with sufficient power to ensure quality and reliability of signal transmission in a wireless communication network.

SUMMARY

The present invention discloses a CPE device that includes a power supply for generating a first power at a first voltage level; a rechargeable battery for generating a second power at a second voltage level; and a power amplifier coupled to the power supply and the rechargeable battery for receiving the first power and the second power to output a third power at a third voltage level higher than either the first voltage level or the second voltage level, wherein the third power is utilized to transmit signals from the CPE device to a BTS.

The construction and method of operation of the invention, however, together with additional objectives and advantages thereof will be best understood from the following description of specific embodiments when read in connection with the accompanying drawings.

DESCRIPTION

This invention describes a rechargeable battery facilitated CPE device for improving uplink transmission power management in a wireless communication network. The following merely illustrates various embodiments of the present invention for purposes of explaining the principles thereof. It is understood that those skilled in the art will be able to devise various equivalents that, although not explicitly described herein, embody the principles of this invention.

Figure 1:
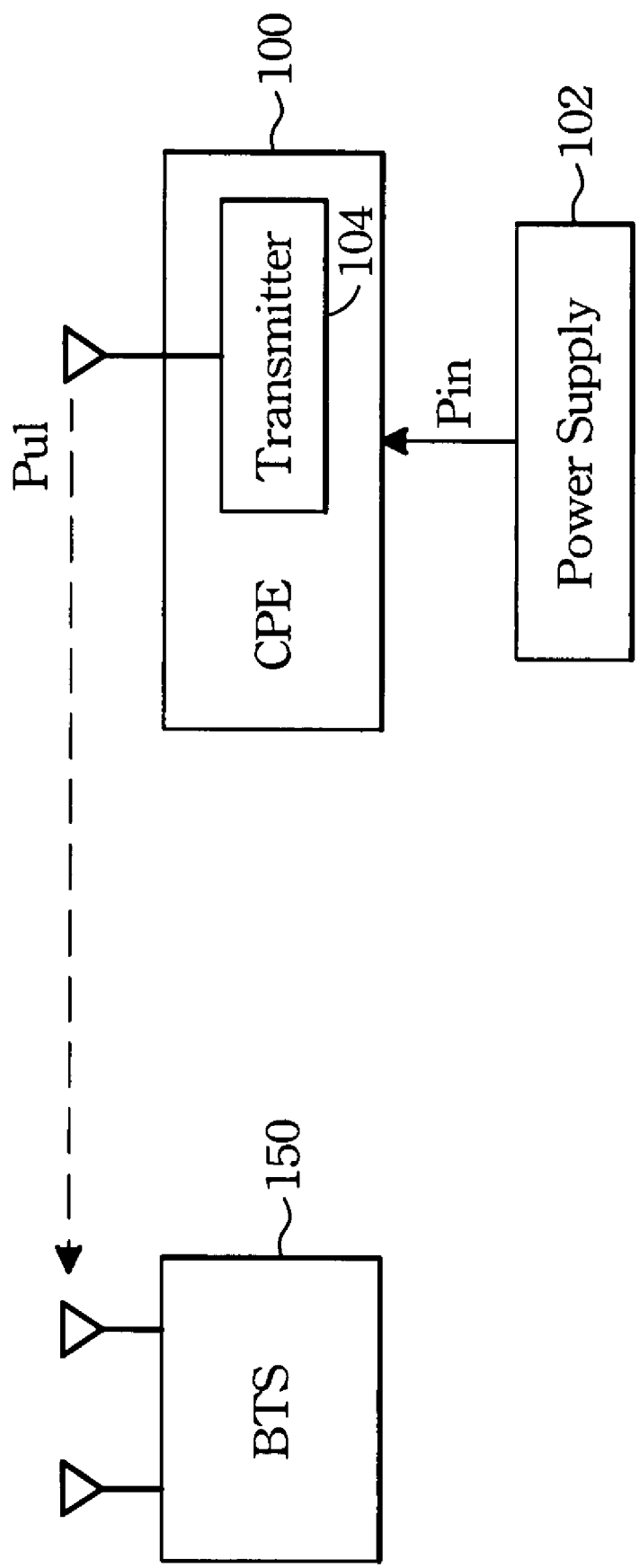
FIG. 1 illustrates a functional block diagram showing a conventional CPE device connected to a BTS via uplink channels.
Figure 2:
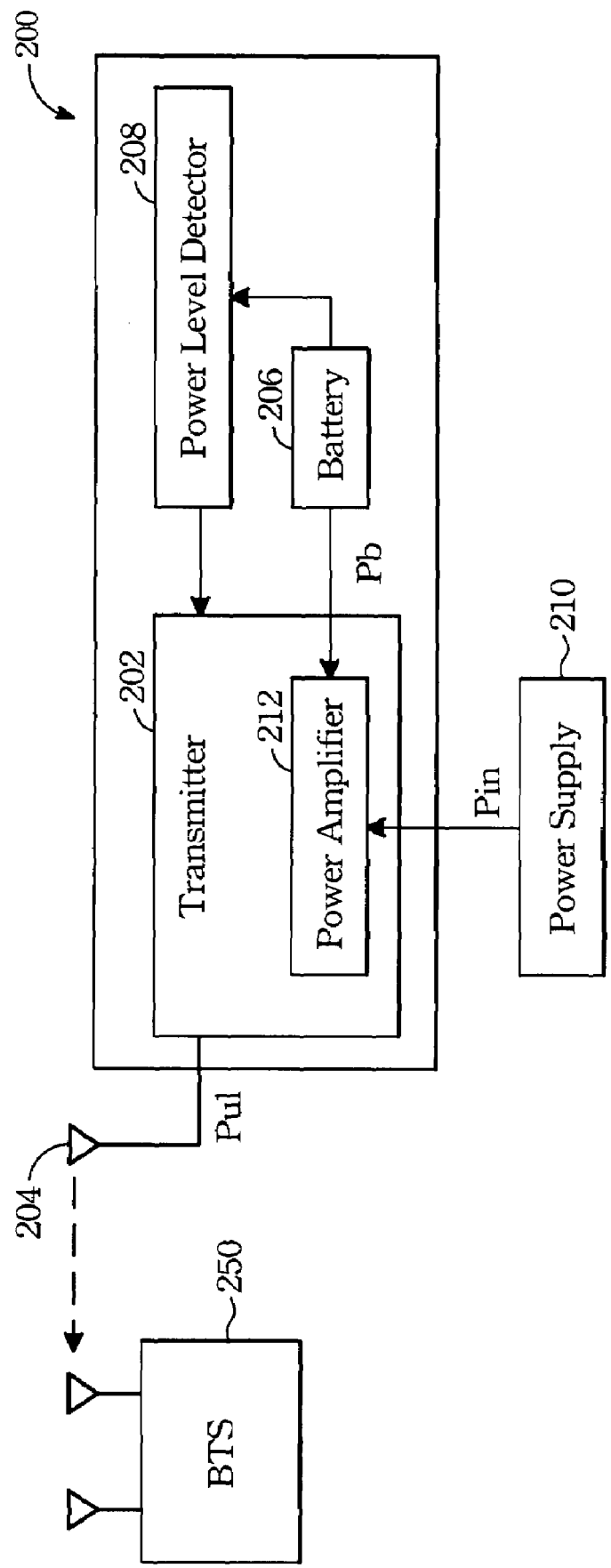
FIG. 2 illustrates a functional block diagram showing a proposed CPE device connected to a BTS via uplink channels in accordance with one embodiment of the present invention.

FIG. 2 illustrates a functional block diagram showing a proposed CPE device 200 connected to a BTS 250 via uplink channels in a wireless communication network, such as a cellular network, a wireless local area network (WLAN), a wireless personal area network (WPAN), and a sensor network, in accordance with one embodiment of the present invention. The wireless communication network can be implemented based on technology such as time division multiple access (TDMA), frequency division multiple access (FDMA), code division multiple access (CDMA), wave division multiple access (WDMA) and orthogonal frequency division multiple access (OFDMA). The CPE device 200 is comprised of at least one transmitter 202 coupled to an antenna 204, a power supply 210, a rechargeable battery 206 and a power level detector 208. The transmitter 202 is implemented with a power amplifier 212 coupled to the power supply 210 and the rechargeable battery 206, which is further coupled to the power level detector 208.

When the CPE device 200 is transmitting signals to the BTS 250 via uplink channels, the power amplifier 212 receives powers from the power supply 210 and the rechargeable battery 206 for the transmitter 202 to transmit signal at a certain power level via the antenna 204. The power supply 210 can be, for example, a DC power line of an adaptor, a USB cable, or a battery that is able to generate electric power at a relatively constant voltage level Pin as opposed to the voltage level Pb generated by the rechargeable battery 206. The power amplifier 212 receives Pin from the power supply 210 and Pb from the rechargeable battery 206, and provides the transmitter 202 with uplink transmission power Pul that exceeds Pin or Pb. In this embodiment, the power amplifier 212 adds the power Pb generated by the rechargeable battery 206 to the power Pin generated by the power supply 210 to provide the uplink transmission power Pul. As a result, the uplink transmission power Pul is substantially equal to the summation of Pin and Pb. As such, the addition of the rechargeable battery 206 increases the power level of the uplink transmission power Pul, which, in turn, improves the signal reception quality at the BTS 250.

The rechargeable battery 206 needs to be recharged once in a while, because its reserved power is consumed over time as the CPE device 200 operates. There are several schemes can be used to charge the rechargeable battery 210. For example, the rechargeable battery 206 can be charged using the power generated by the power supply 210 when no signal is transmitted from the CPE device 200 to the BTS 250, and terminates the charging when the CPE device 200 is sending out uplink signals. In another example, the rechargeable battery 206 is constantly charged as long as the CPE device 200 receives power from the power supply 210.

The BTS 250 allocates channel resources, such as bandwidth and downlink transmission power for each channel, based on the information provided by the voltage level Pul of the uplink transmission signal, which may vary over time depending on the charging state of the rechargeable battery 206. In order to properly allocate channel resources, the BTS 250 needs to have information regarding the variation of the voltage level Pb indicating the charging state of the rechargeable battery 206. In this embodiment, the power level detector 208 detects voltage level Pb, and provides the transmitter 202 with a feedback signal indicating the detected voltage level Pb. The transmitter 202 then transmits the feedback signal to the BTS 250 via the antenna 204, so that it can obtain information regarding the charging state of the rechargeable battery 210 and adjust channel resources for the CPE 200 accordingly. It is understood by people skilled in the art of telecommunications and integrated circuit industry that the power level detector 208 can be readily implemented without undue experiment of any kind. For example, the power level detector can a digital signal processor that is capable of receiving voltage inputs from the rechargeable battery 206, and generating outputs indicating the voltage level of the inputs.

Alternatively, the BTS 250 can obtain information regarding the voltage level Pb based on prediction and modeling of the charging state of the rechargeable battery 206. For example, the transmitter 202 transmits an initial value of the voltage level Pb and the voltage level Pin to the BTS 250, and the BTS 250 predicts the uplink transmission power level Pul based on Pin and the initial value of Pb adjusted by modeling the charging state of the rechargeable battery 206. In such case, no feedback signal indicating the actual voltage level Pb will be needed from the CPE device 200.

One advantage of the proposed rechargeable battery enhanced CPE device is the improvement in power management. The additional rechargeable battery increases the voltage level of the uplink transmission power, thereby improving the quality of signal reception at the BTS. Moreover, multiple schemes are proposed for the BTS to obtain information regarding the charging state of the rechargeable battery, thereby improving channel resource allocations.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A device comprising:
   a power supply configured to generate a first power at a first voltage level;
   a rechargeable battery configured to generate a second power at a second voltage level; and
   a power amplifier coupled to the power supply and the rechargeable battery, wherein the power amplifier is configured to receive the first power and the second power and configured to output a third power at a third voltage level that equals a sum of the first voltage level and the second voltage level.

2. The device of claim 1, and further comprising a transmitter that is configured to transmit signals via at least one antenna, wherein the power amplifier is implemented within the transmitter and is further configured to transmit signals at a power level based on the third power at the third voltage level via the at least one antenna.

3. The device of claim 2, and further comprising a power level detector coupled to the rechargeable battery, wherein the power level detector is configured to detect the second voltage level which varies depending on a charging state of the rechargeable battery.

4. The device of claim 3, wherein the power level detector is further configured to send a feedback signal indicating the second voltage level to the transmitter, and wherein the transmitter transmits the feedback signal to a base station device for allocation of channel resources.

5. A system comprising a base station device and the device of claim 3, wherein the base station device is configured to allocate channel resources by predicting the third power level according to a model that represents a charging state of the rechargeable battery.

6. The system of claim 5, wherein the transmitter transmits an initial value of the second voltage level and the first voltage level to the base station device, and the base station device is configured to predict the third power level based on the first voltage level and the initial value of the second voltage level adjusted by the model that represents the charging state of the rechargeable battery.

7. The device of claim 3, wherein the power level detector is implemented by a digital signal processor.

8. The device of claim 2, wherein the rechargeable battery is charged when the transmitter is not transmitting a signal.

9. A device comprising:
   a power supply configured to generate a first power at a first voltage level;
   a rechargeable battery configured to generate a second power at a second voltage level;
   a transmitter having a power amplifier coupled to the power supply and to the rechargeable battery, wherein the power amplifier is configured to receive the first power and the second power to output a third power at a third voltage level higher than either the first voltage level or the second voltage level, and wherein the transmitter is configured to transmit signals at a power level based on the third power at the third voltage level via at least one antenna; and
   a power level detector coupled to the rechargeable battery, wherein the power level detector is configured to detect the second voltage level which varies depending on a charging state of the rechargeable battery.

10. The device of claim 9, wherein the power amplifier is configured to produce the third power at the third voltage level such that it equals sum of the first voltage level and the second voltage level.

11. The device of claim 9, wherein the power level detector is further configured to send a feedback signal indicating the second voltage level to the transmitter, and wherein the transmitter transmits the feedback signal to a base station device for allocation of channel resources.

12. A system comprising a base station device and the device of claim 9, wherein the base station device is configured to allocate channel resources by predicting the third power level according to a model that represents a charging state of the rechargeable battery.

13. The system of claim 12, wherein the transmitter transmits an initial value of the second voltage level and the first voltage level to the base station device, and the base station device is configured to predict the third power level based on the first voltage level and the initial value of the second voltage level adjusted by the model that represents the charging state of the rechargeable battery.

14. The device of claim 9, wherein the power level detector is implemented by a digital signal processor.

15. The device of claim 9, wherein the rechargeable battery is charged when the transmitter is not transmitting a signal.

16. A method comprising:
generating a first power at a first level with a power supply;
generating a second power at a second level with a rechargeable battery;
producing a third power at a third level from the first power and the second power, wherein the third level is equal to a sum of the first level and the second level; and
transmitting a signal using the third power at the third level such that the transmitted signal is at a power level based on the third power at the third power level.

17. The method of claim 16, and further comprising detecting the second level which varies according to a charging state of the rechargeable battery, and transmitting a signal indicating the second level to another device.

18. The method of claim 16, and further comprising allocating communication channel resources using information carried in the signal and by predicting the third level according to a model that represents a charging state of the rechargeable battery.

* * * * *